Oct. 9, 1956     M. M. NEVEROSKI, JR     2,765,544
EDUCATIONAL DEVICE
Filed Aug. 24, 1954     2 Sheets-Sheet 1
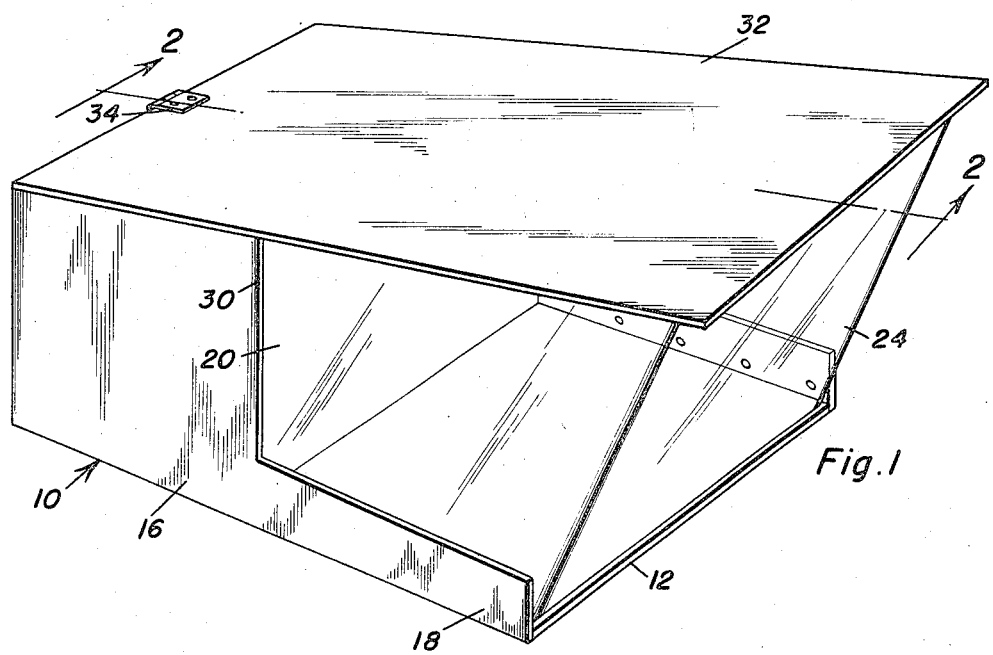
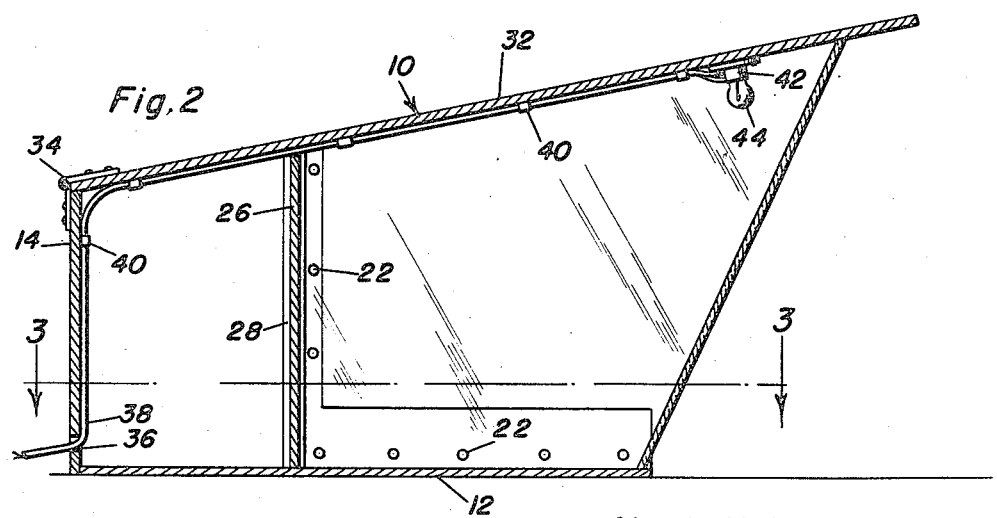
Martin M. Neveroski, Jr.
INVENTOR.

Oct. 9, 1956　　　M. M. NEVEROSKI, JR　　　2,765,544
EDUCATIONAL DEVICE
Filed Aug. 24, 1954　　　　　　　　　　　　2 Sheets-Sheet 2
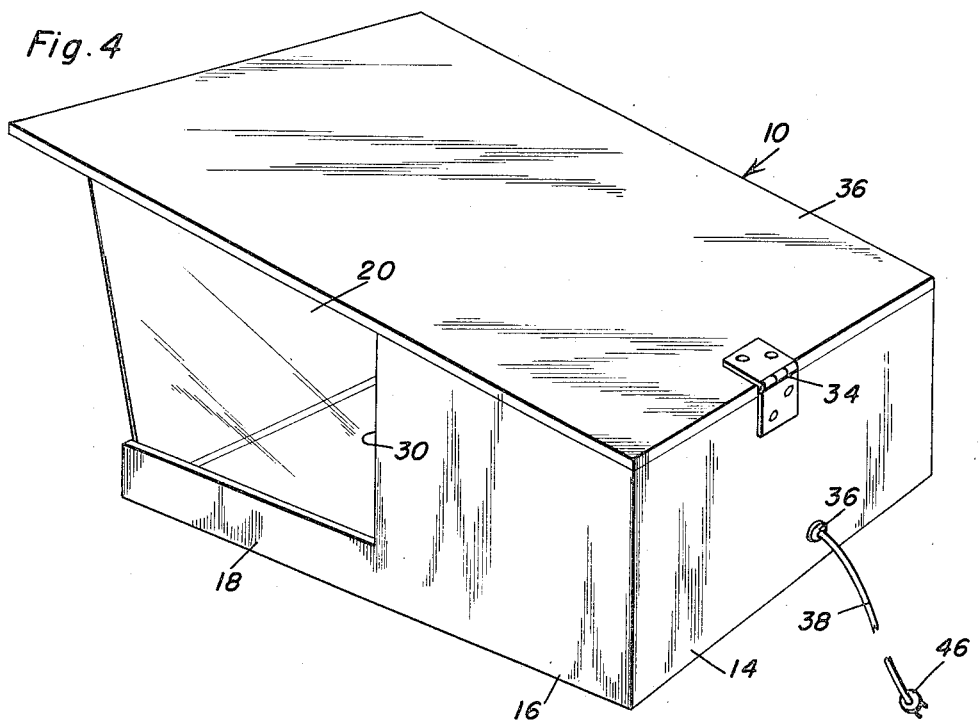
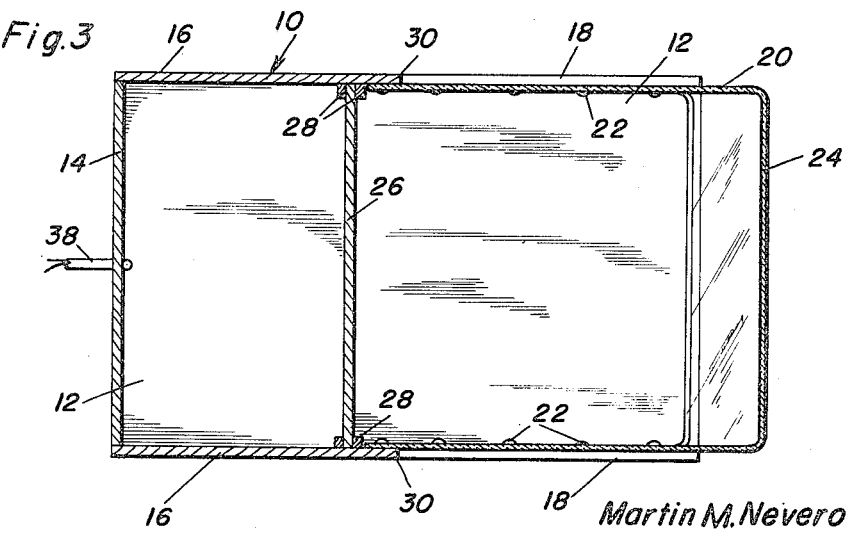
Martin M. Neveroski, Jr.
INVENTOR.

United States Patent Office 2,765,544
Patented Oct. 9, 1956

2,765,544

EDUCATIONAL DEVICE

Martin M. Neveroski, Jr., Gary, Ind.

Application August 24, 1954, Serial No. 451,831

1 Claim. (Cl. 35—51)

This invention relates to an educational device and more specifically provides a simulated display room wherein the articles displayed may be rearranged and changed as desired thereby providing a device for practicing the arrangement of articles in a display show room.

An object of this invention is to provide an educational device preferably in the form of a toy for stimulating the creative imagination of a child thereby developing at an early age this normally latent faculty.

Another object of this invention is to provide an educational device in the form of a show room or a display room wherein access is provided to the show room for permitting arrangement and rearrangement of articles therein, thereby illustrating and demonstrating the proper procedures and the desired arrangement for enhancing the esthetic qualities of the articles to be displayed.

A further object of the present invention is to provide an educational device in the form of a building having a show room wherein the top of the show room is removable for insertion and removal as well as rearrangement of simulated articles to be displayed wherein the creative imagination will be utilized in arranging the articles for cultivating and developing the imagination and teaching the preferable and desired arrangements for best attracting window shoppers.

Yet another important object of the present invention is to provide an educational device in the form of a toy building for teaching the fundamentals of the display art wherein the device is simple in construction, easy to use, intriguing, well adapted for its intended purposes, and relative inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a perspective view of the educational device of the present invention showing the transparent window to the display room and the pivotally mounted top therefor;

Figure 2 is a longitudinal, vertical, sectional view taken substantially upon a plane passing along section line 2—2 of Figure 1 showing the details of construction of the educational device of the present invention and illustrating the structural details of the simulated building, together with the pivotal top mounted thereon;

Figure 3 is a top plan sectional view taken substantially upon a plane passing along section line 3—3 of Figure 1 showing further structural details of the present invention; and Figure 4 is a perspective view taken from the rear corner of the simulated building of the present invention showing the arrangement of the hinged top and other structural details of the display window.

The educational device of the present invention is in the form of a simulated building as generally indicated by the numeral 10 and including a floor 12, an end wall 14 and two side walls 16. The side walls 16 include a forwardly projecting lower portion 18 to which is attached a generally U-shaped transparent member 20 by suitable fasteners 22. The U-shaped transparent member 20 includes an upwardly and outwardly inclined bight portion 24 forming a front wall to the building 10. The leg portions of the U-shaped transparent member 20 form a continuation of the side walls 16, thereby forming a transparent display room bounded by the bottom 12, the partial side wall portions 18, and an intermediate wall 26 positioned rearwardly of the transparent member 20. The intermediate wall 26 is vertically slidably received in vertical guideways formed by a pair of spaced vertical members 28 positioned on each side wall 16 on the inner surface thereof adjacent the forward vertical edge 30. It will be seen that the transparent member 20 engages and is secured to the side walls 16 along the vertical edge and along the horizontal edge of the upper portion of the forwardly extending lower portions 18. The front wall 24 is vertically and upwardly inclined outwardly thereby giving the impression of a perspective view of the display room.

An upwardly and forwardly inclined roof member 32 forming a top or closure for the building 10 is hingedly secured at its rear edge to the rear wall 14 by a suitable hinge member 34 wherein the top 32 may be pivoted about hinge 34 to an open or closed position thereby providing access into the interior of the show room or display room defined by the transparent U-shaped member 20 and also provides access into the area between the intermediate wall 26 and the rear wall 14 that may be used as a storage room for positioning the articles to be displayed. Adjacent the lower end of the rear wall 14 is provided an aperture 36 for the passage of an electrical wire 38 that is secured adjacent the upper end of the rear wall 14 and adjacent the rear end of the upper wall 32 by clips 40 and extends along the under surface of the top 32 and is connected to an electrical receptacle 42 having a suitable light 44 therein for illuminating the display area. The electric wire 36 may be provided with a suitable male plug 46 for insertion in a suitable electrical source (not shown).

In operation, the articles to be displayed are positioned on the floor 12 in the area defined by the intermediate wall 26 and the U-shaped transparent member 20 wherein the top 32 may be raised and lowered as desired for rearranging, removing, replacing, or placing the articles as desired. The area between the rear wall 14 and the intermediate wall 26 may be utilized as a storage area or in some cases, it may be utilized for auxiliary display or a display of articles wherein a different perspective is desired. The light bulb 44 may be colored for providing various lighting effects and also may or may not be illuminated as desired.

While the device is illustrated with the top 32 being hingedly connected to the rear wall 14, it will be understood that the device may be constructed with other equivalent means for retaining the top or roof thereon. This could be accomplished by a tongue and groove arrangement, pegs retaining the top on the side walls or any other suitable fastening means. Also, the building may be constructed of wood, paper, paper board, metal, plaster, or the like. The transparent member 20 may be constructed of any suitable plastic, glass, or the like wherein the entire building will resemble and simulate a commercial store or other place of business having a show room for displaying articles to be sold. Children will find a toy embodying the principles of this invention intriguing as they may place cutout dolls and other similar articles thereon and the entire display area may be changed to a winter scene by the use of snow and other similar articles or a summer scene may be depicted by a similar rearrangement of the articles and simulated summer articles of wear as well as a simulated deep green may be employed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An educational device comprising a simulated building having a floor, a rear wall, side walls, a front wall, a roof, said front wall and a portion of said side walls being continuous and transparent, said roof being openable to afford access into the interior of the building wherein various articles may be positioned behind the transparent walls for demonstrating the display of the articles, and a vertically removable intermediate wall positioned in spaced relation to the rear wall and adjacent to the rear edges of the transparent portions of the side walls, said intermediate wall forming a rear wall for the display area bounded by the transparent wall and forming a storage compartment between the same and the rear wall, said intermediate wall being changeable and provided with various simulated scenes wherein the background of the display area may be changed, and means for illuminating the area between the intermediate wall and the front wall, said roof being upwardly and forwardly inclined and said front wall sloping upwardly and outwardly for simulating the display area of a commercial building.

References Cited in the file of this patent

UNITED STATES PATENTS

| | | |
|---|---|---|
| D. 156,001 | Haynes | Nov. 15, 1949 |
| 1,567,849 | Kliner | Dec. 29, 1925 |
| 1,569,066 | Beiger | Jan. 12, 1926 |
| 1,955,194 | Leake | Apr. 17, 1934 |
| 2,410,221 | Latura | Oct. 29, 1946 |
| 2,430,743 | Sims | Nov. 11, 1947 |
| 2,544,034 | Levering | Mar. 6, 1951 |
| 2,637,138 | Doran | May 5, 1953 |
| 2,671,161 | Johnson | Mar. 2, 1954 |

FOREIGN PATENTS

| | | |
|---|---|---|
| 183,074 | Great Britain | July 20, 1922 |